United States Patent
Byrne et al.

(10) Patent No.: US 9,545,969 B2
(45) Date of Patent: Jan. 17, 2017

(54) CONVERSION SCOOTER

(71) Applicant: Radio Flyer Inc., Chicago, IL (US)

(72) Inventors: Emily Byrne, Chicago, IL (US); Ian Grout, Strykersville, NY (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 14/168,252

(22) Filed: Jan. 30, 2014

(65) Prior Publication Data

US 2014/0217685 A1 Aug. 7, 2014

Related U.S. Application Data

(60) Provisional application No. 61/759,792, filed on Feb. 1, 2013.

(51) Int. Cl.
*B62K 13/00* (2006.01)
*B62K 9/02* (2006.01)

(52) U.S. Cl.
CPC ...... *B62K 13/00* (2013.01); *B62K 9/02* (2013.01)

(58) Field of Classification Search
CPC ............ B60K 5/00; B62K 13/00; B62K 13/08
See application file for complete search history.

(56) References Cited

U.S. PATENT DOCUMENTS

| | | | |
|---|---|---|---|
| 1,379,305 A | 5/1921 | Johns | |
| D261,784 S | 11/1981 | Fisher | |
| 4,360,224 A * | 11/1982 | Sato et al. | 280/269 |
| 4,657,270 A * | 4/1987 | Allen et al. | 280/7.1 |
| 4,958,842 A | 9/1990 | Chang | |
| D327,101 S | 6/1992 | Halter et al. | |
| 6,089,586 A * | 7/2000 | Rudell et al. | 280/282 |
| 6,296,268 B1 | 10/2001 | Ford et al. | |
| D469,477 S | 1/2003 | Horchler | |
| 6,581,949 B2 * | 6/2003 | Lopez | 280/278 |
| D571,861 S | 6/2008 | On | |
| D571,863 S | 6/2008 | On | |
| 7,487,982 B2 | 2/2009 | Chan | |
| D631,102 S | 1/2011 | Jessie, Jr. | |

(Continued)

OTHER PUBLICATIONS

<http://www.vtechkids.com/product/detail/1816/3_in_1_Learning_Zebra_Scooter>, VTech 3-in-1 Learning Scooter, Scotter, dated at least as early as Jan. 1, 2013.
<http://www.buzzillions.com/reviews/berchet-twin-rider-ride-on-scooter-reviews#Description>, Berchet Twin Rider Ride-On Scooter, Scooter, dated at least as early as Jan. 1, 2013.

(Continued)

*Primary Examiner* — Erez Gurari
(74) *Attorney, Agent, or Firm* — McDermott Will & Emery LLP

(57) ABSTRACT

A conversion scooter is adapted for use as a sit to ride scooter in a first configuration and a stand to ride scooter in a second configuration. The conversion scooter has a frame, a steering assembly and a seat removably coupled to the frame. The steering assembly can be steered by a user in the first and second configurations. The frame has a first end portion and a second end portion, and a foot platform extending between the first end portion and the second end portion. In the first configuration a seat surface of the seat is generally parallel to a longitudinal axis of the frame, and in the second configuration the seat is coupled to a first end portion of the frame and the seat is generally transverse to the longitudinal axis of the frame. Seat securing members secure the seat in the first and second configurations.

20 Claims, 7 Drawing Sheets

(56) References Cited

U.S. PATENT DOCUMENTS

| | | | |
|---|---|---|---|
| 8,500,134 | B2 | 8/2013 | Tzoreff |
| 8,517,403 | B2 | 8/2013 | Jessie, Jr. |
| D710,949 | S | 8/2014 | Huang |
| 9,010,780 | B1 | 4/2015 | Chiu |
| 9,016,702 | B2 | 4/2015 | Huang |
| 9,022,406 | B2 | 5/2015 | Ouboter |
| 9,114,821 | B1 | 8/2015 | Xu |
| 2002/0000702 | A1 | 1/2002 | Charron |
| 2003/0030242 | A1 | 2/2003 | Lopez |
| 2008/0217875 | A1 | 9/2008 | Barak |
| 2010/0148460 | A1 | 6/2010 | Nelson |
| 2010/0283220 | A1* | 11/2010 | Tzoreff ................. 280/281.1 |
| 2011/0198819 | A1 | 8/2011 | Jessie |
| 2013/0082451 | A1 | 4/2013 | Lin |
| 2015/0097346 | A1 | 4/2015 | Mucaro |

OTHER PUBLICATIONS

<http://smart-trike.com/products/product-sample-1/>, SmarTrike All-in-One, 6-in-1, Scooter, dated at least as early as Jan. 1, 2013.

<http://www.littletikesitalia.com/uploaded/pdf/9061611.pdf>, Little Tikes 2-in-1 Scooter, Scooter, dated at least as early as Jan. 1, 2013.

<http://www.micro-scooters.co.uk/scooters-model-3-in-1-seat-ages-1-3.html>, Micro 3-in-1 Seat, Scooter, dated at least as early as Jan. 1, 2013.

<http://www.hasbro.com/playskool/en_US/shop/details.cfm?R=8EC46935-6D40-1014-8BF0-9EFBF894F9D4:en_US>, Playskool Explore 'N Grow Step Start Walk 'N Ride, Scooter, dated at least as early as Jan. 1, 2013.

International Search Report, mailed May 21, 2014, for related International Patent Application No. PCT/US2014/014036.

* cited by examiner

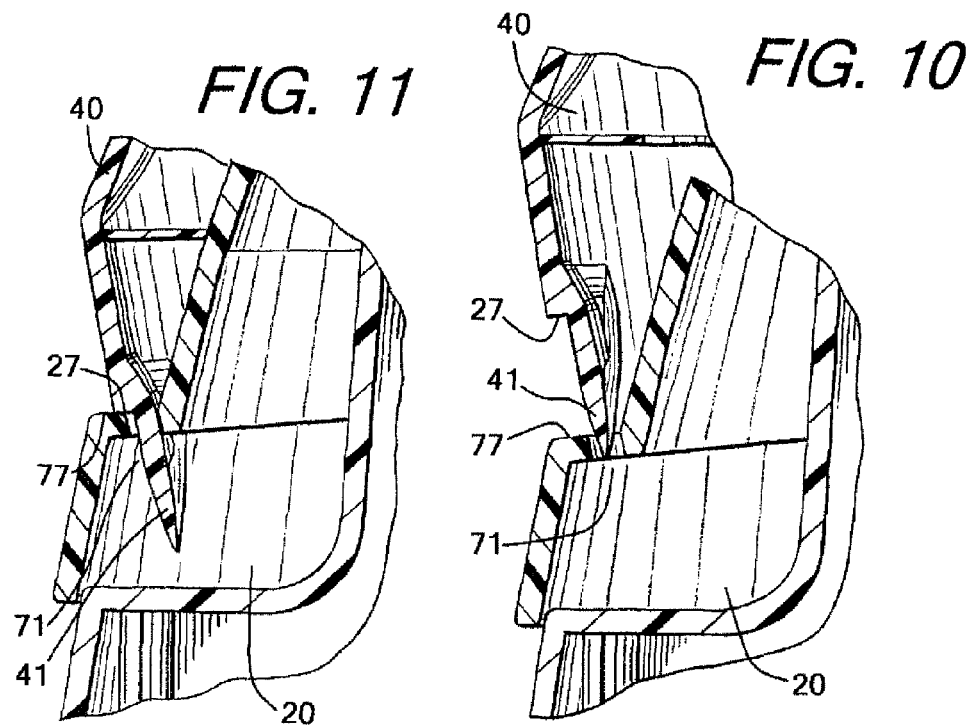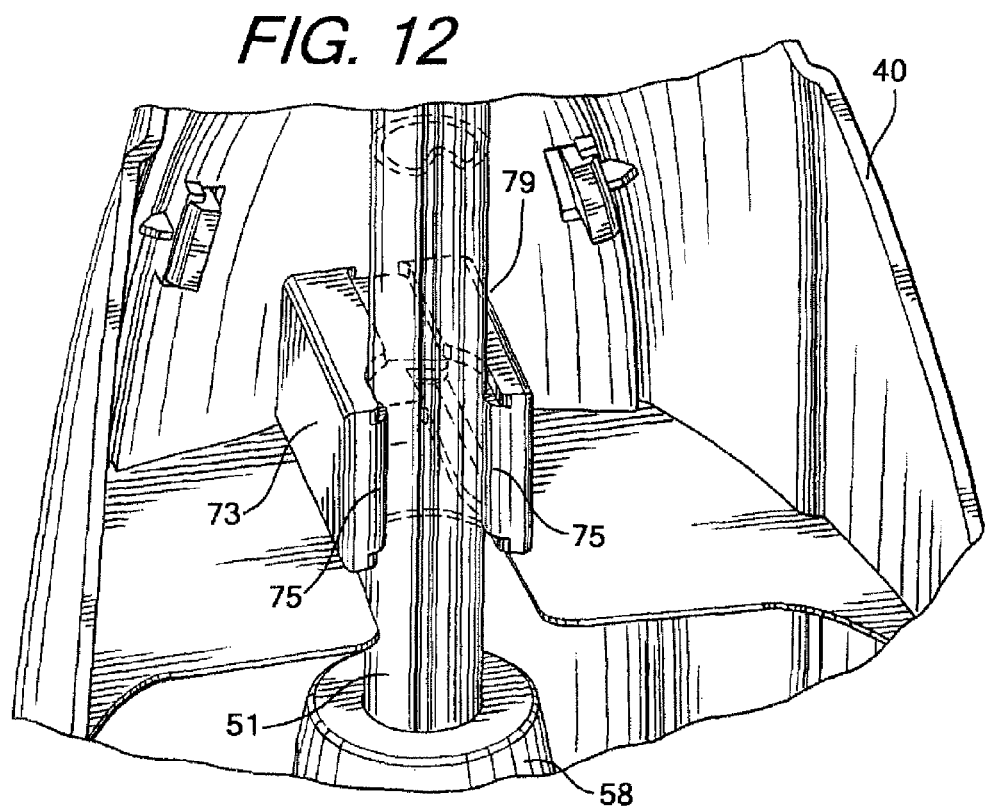

CONVERSION SCOOTER

CROSS-REFERENCE TO RELATED APPLICATIONS

This application claims priority to U.S. Provisional Patent Application No. 61/759,792, filed Feb. 1, 2013, which is incorporated herein by reference in its entirety and made a part hereof.

FEDERALLY SPONSORED RESEARCH OR DEVELOPMENT

Not Applicable.

TECHNICAL FIELD

The present disclosure generally relates to a conversion scooter. In particular, a scooter is provided that may be converted between a seated riding configuration and a standing riding configuration.

BACKGROUND

Scooters that provide a seat for seated riding and scooters that provide a foot platform for stand up riding are known. Scooters with a seat may be used for younger children or children with less developed balance to ride on while sitting down. Other scooters have a foot platform or deck instead of a seat and may be used for older children or children with more developed balance to ride on while standing up. If a child outgrows the seated scooter or becomes more coordinated in balance, a standing scooter may be utilized. Similarly, if a child who typically rides a standing scooter does not want to stand up, or is unable to ride in the standing position (e.g., the child has a leg injury), then a seated scooter may be obtained. The present embodiments seek to overcome certain of these limitations and other drawbacks of the prior art, and to provide new features not heretofore available. A full discussion of the features and advantages of the present embodiments is deferred to the following detailed description, which proceeds with reference to the accompanying drawings.

SUMMARY

According to one embodiment, the disclosed subject technology relates to a ride on that converts from a stand-to-ride vehicle to a sit-to-ride vehicle, and vice versa. In one embodiment the conversion scooter has a frame, a steering assembly, at least one front wheel and a rear wheel. In the sit-to ride mode the conversion scooter has a seat removably coupled to the frame such that a top surface of the seat is generally parallel to the frame. In the sit-to-ride mode, the conversion scooter seat is removed and moved to the front of the frame and positioned generally transverse to a longitudinal axis of the frame.

According to another embodiment, the frame has a first end portion and a second end portion, and a foot platform extending between the first end portion and the second end portion.

According to another embodiment the seat is removably coupled to the frame. The seat has a first end and a second end. In a first configuration of the conversion scooter the first end of the seat is coupled to the frame near the first end portion of the frame and the second end of the seat is coupled adjacent the second end portion of the frame. The conversion scooter is adapted for use as a sit to ride scooter in the first configuration. In a second configuration of the conversion scooter the first end of the seat is coupled to a first end portion of the frame and the seat is generally transverse to a longitudinal axis of the frame. The conversion scooter is adapted for use as a stand to ride scooter in the second configuration. According to another embodiment, the seat has a top surface and opposing side surfaces extending away from the top surface. In another example the seat has a curvilinear cross section. According to yet another embodiment, the seat can be transitioned from the first configuration to the second configuration, and from the second configuration to the first configuration, without the use of tools.

According to another embodiment, the steering assembly is rotatably coupled to the frame adjacent the first end portion of the frame. In another example the steering assembly is located between the seat and the second end portion of the frame when the seat is in the second configuration. According to another embodiment, the steering assembly is steerable by a user in the first and second configuration. According to another embodiment, the steering assembly has a telescoping shaft to raise and lower the steering assembly. According to another embodiment a handlebar is connected to the telescoping shaft for steering the steering assembly. In yet another embodiment, a front axle is coupled to the steering assembly.

According to another embodiment, at least one wheel is coupled to the steering assembly. This wheel is generally referred to as the front wheel. According to another embodiment, a first front wheel is coupled adjacent one end of the front axle and a second front wheel is coupled adjacent an opposing end of the front axle.

According to another embodiment, a wheel is rotatably coupled to the frame adjacent a second end portion of the frame. This wheel is generally referred to as the rear wheel.

According to another embodiment, the conversion scooter has a first seat locking member securing the second end of the seat to the frame in the first configuration. In another embodiment, the conversion scooter has a second seat locking member securing the seat to the steering assembly in the second configuration. In another embodiment, in the first configuration the seat is coupled to the frame adjacent one of the first end portion and second end portion of the frame via a plurality of tabs and receivers, and the seat is coupled to the frame adjacent the other of the first end portion and second end portion of the frame via a releasable latch. In yet another embodiment, in the second configuration the seat is coupled to the frame adjacent the first end portion of the frame via a plurality of tabs and receivers, and in the second configuration the seat is coupled to the steering assembly with a releasable clip.

According to another embodiment, the conversion scooter has a basket coupled to the steering assembly in the first configuration and the second configuration.

According to another embodiment, the conversion scooter has a frame having a first end portion and a second end portion; a foot platform extending between the first end portion and the second end portion; a steering assembly coupled to the frame adjacent the first end portion, the steering assembly having a first wheel and a second wheel coupled thereto; a single wheel rotatably coupled to the frame adjacent a second end portion of the frame; a seat removably coupled to the frame, wherein the conversion scooter can be configured in a first configuration and a second configuration, wherein the steering assembly is rotatable in the first configuration and the second configuration, and wherein no tools are needed to transition the scooter from the first configuration to the second configuration; the seat being coupled to the frame and having a seat surface generally parallel to a longitudinal axis of the frame in the first configuration; and, the seat being removable from the frame and adapted to be coupled to the frame in another location in the second configuration.

According to another embodiment, the conversion scooter has a frame having a first end portion and a second end portion, and a foot platform extending between the first end portion and the second end portion; a steering assembly coupled to the frame adjacent the first end portion, the steering assembly having a first wheel rotatably coupled thereto; a second wheel rotatably coupled to the frame adjacent a second end portion of the frame; a seat removably coupled to the frame in a first configuration and a second configuration, wherein no tools are needed to transition the scooter from the first configuration to the second configuration; the seat is coupled to the frame and has a seat surface generally parallel to a longitudinal axis of the frame in the first configuration, and the conversion scooter adapted for use as a sit to ride scooter in the first configuration; a first releasable seat locking member securing the seat to the frame in the first configuration; the seat being movable to the second configuration, and a second releasable seat locking member securing the seat to the steering assembly in the second configuration, wherein the conversion scooter is adapted for use as a stand to ride scooter in the second configuration.

According to another embodiment, the steering assembly is located between the seat and the second end portion of the frame when the seat is in the second configuration.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

FIG. 10 is a cut-away side view of a portion of the conversion scooter of FIG. 3 with the seat in a nearly installed stand to ride position.

FIG. 11 is a cut-away side view of the portion of the conversion scooter of FIG. 10 with the seat in an installed stand to ride position.

FIG. 12 is a rear view of the conversion scooter of FIG. 3 in the stand to ride configuration and with the bucket removed.

DETAILED DESCRIPTION

Figure 1:
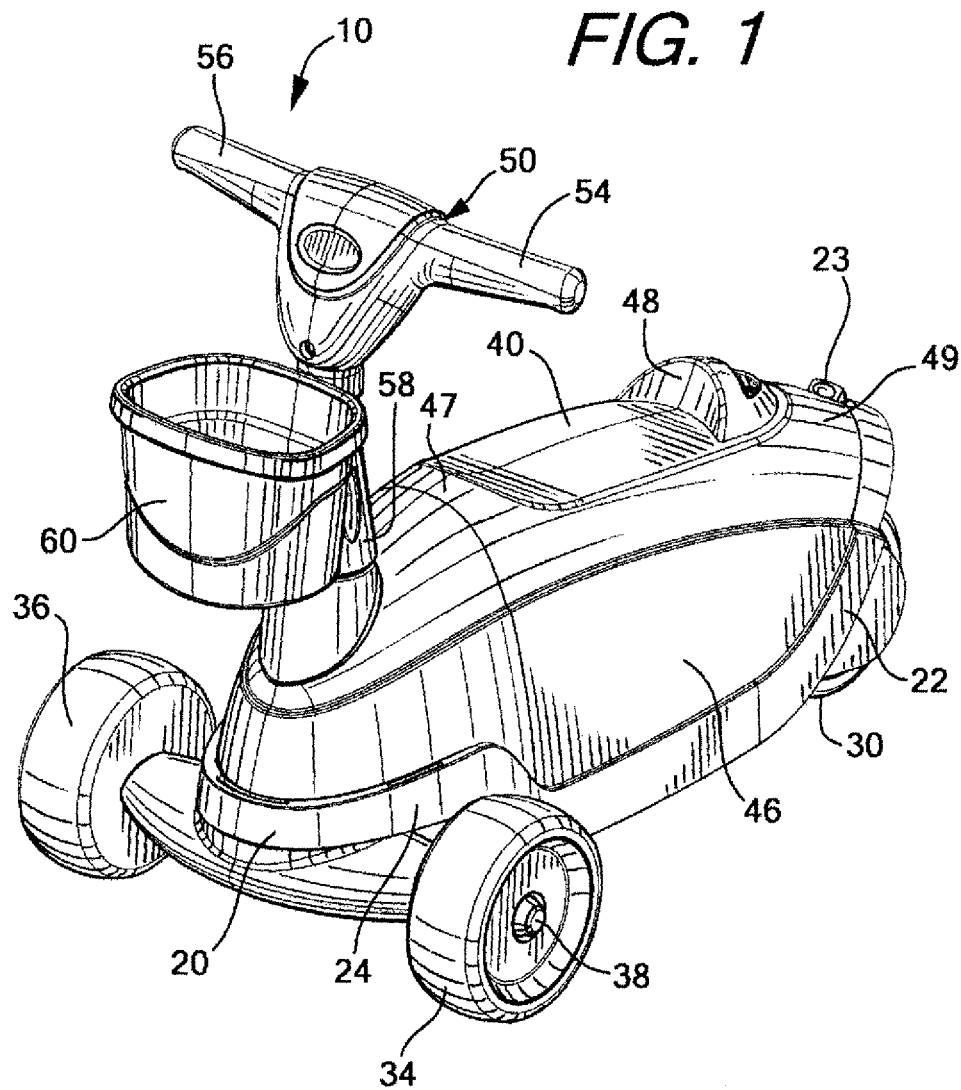
FIG. 1 is a front perspective view of an embodiment of a conversion scooter in the sit to ride configuration.
Figure 2:
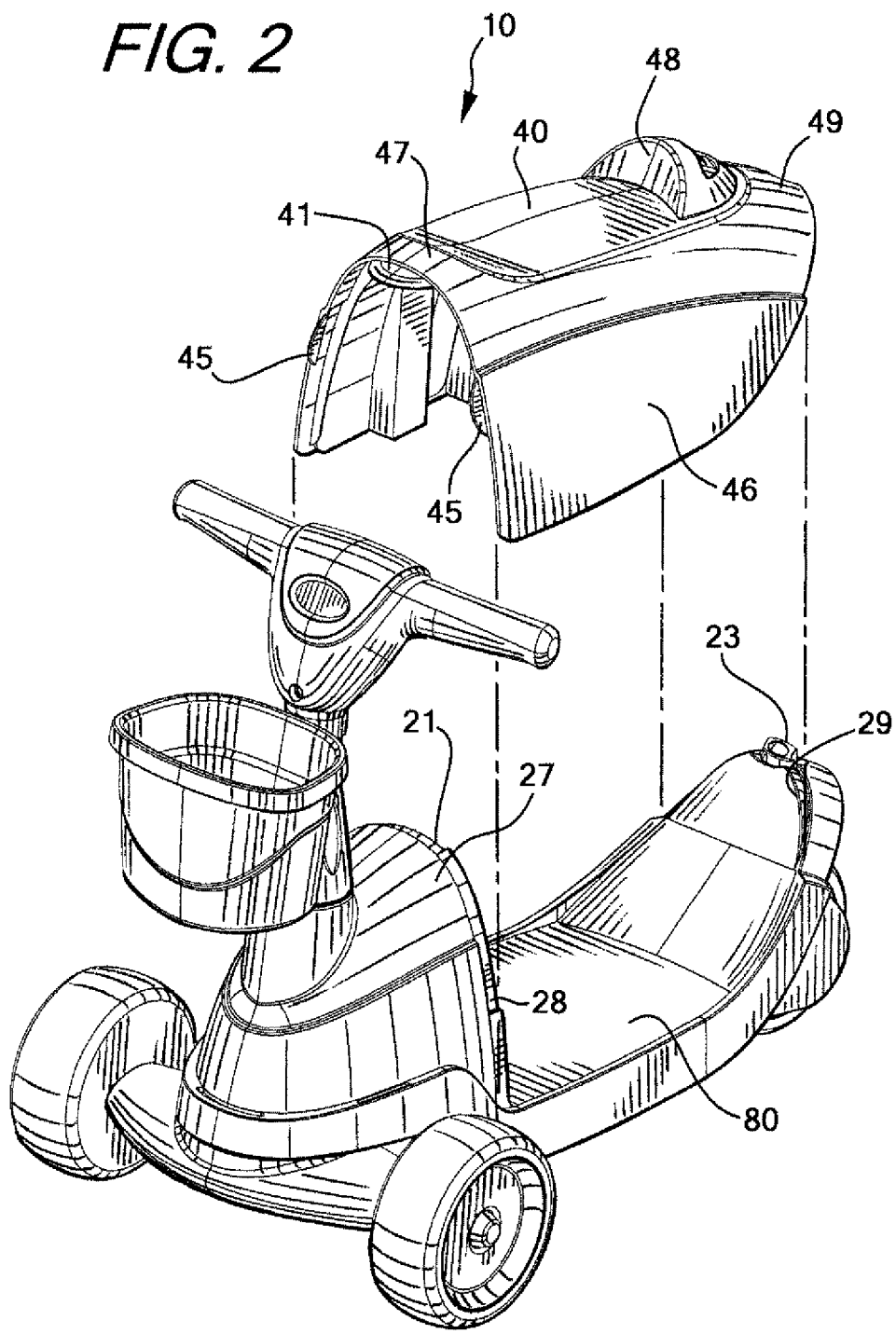
FIG. 2 is a partially exploded front perspective view of the conversion scooter of FIG. 1.
Figure 3:
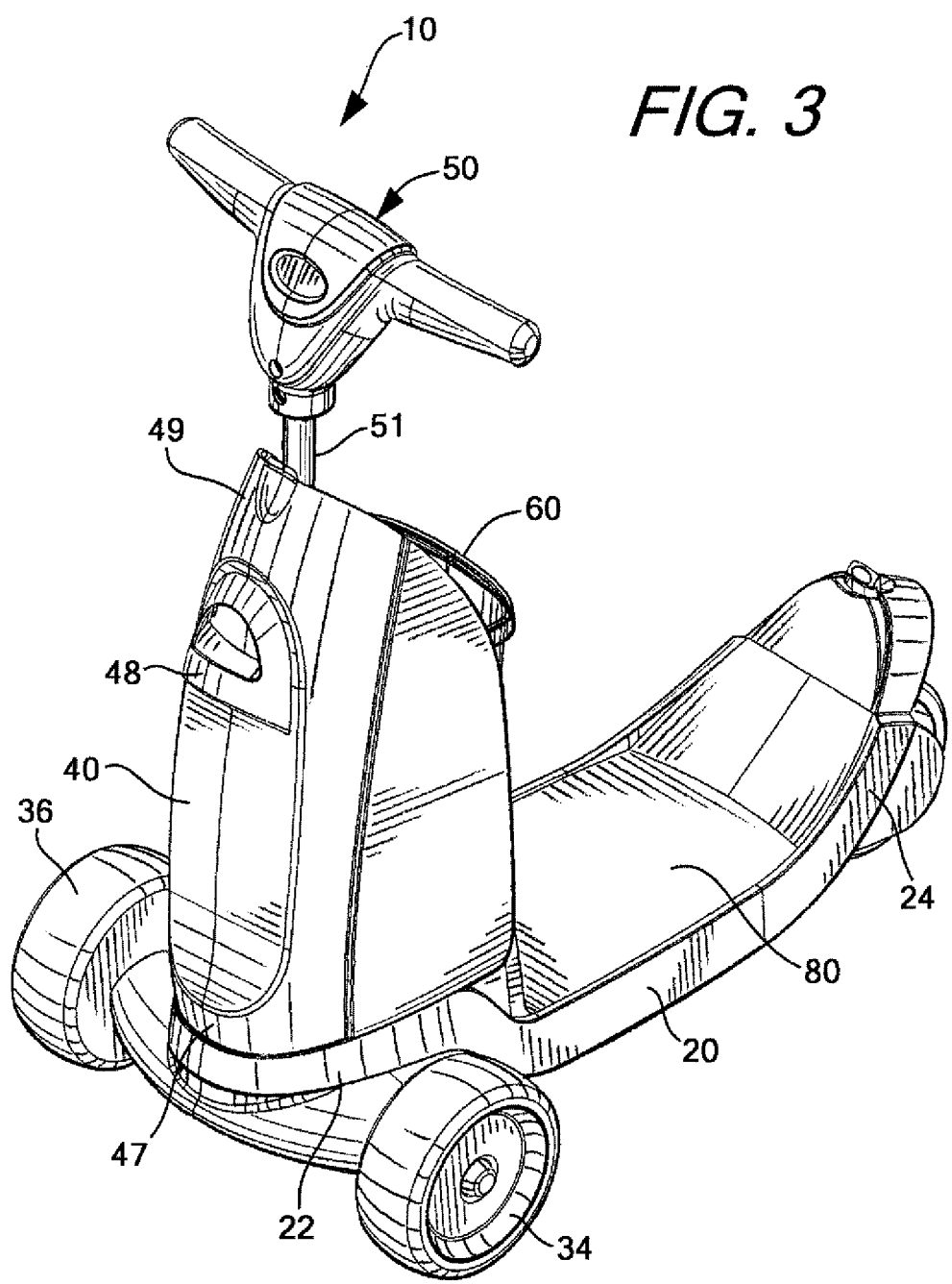
FIG. 3 is a front perspective view of an embodiment of a conversion scooter in the stand to ride configuration.
Figure 4:
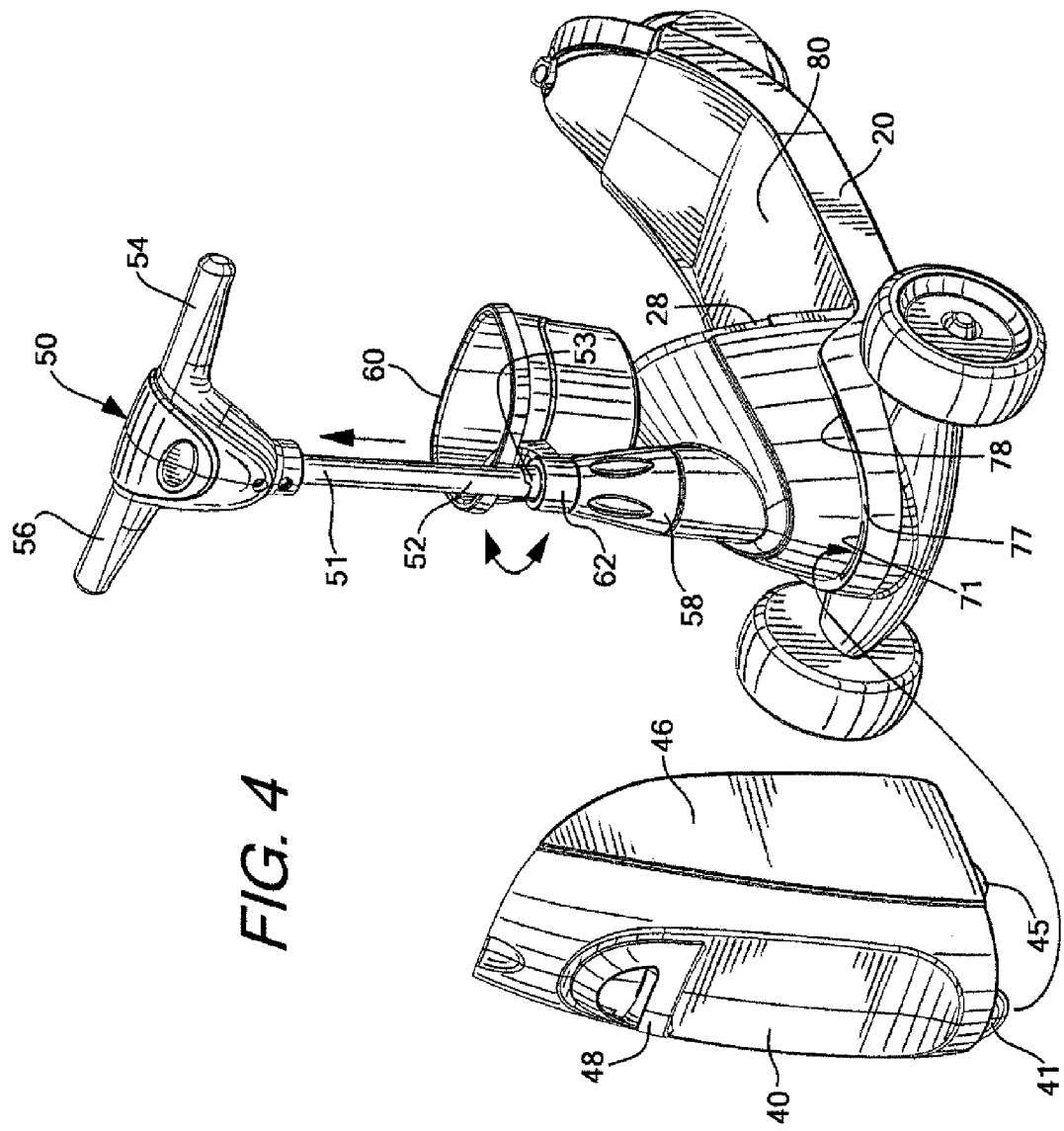
FIG. 4 is a partially exploded front perspective view of the conversion scooter of FIG. 3.

While the conversion scooter discussed herein is susceptible of embodiments in many different forms, there is shown in the drawings, and will herein be described in detail, preferred embodiments with the understanding that the present description is to be considered as an exemplification of the principles of the conversion scooter and is not intended to limit the broad aspects of the disclosure to the embodiments illustrated.

The conversion scooter is a product that can be used by children from the infant stage through the toddler stage, and into the adolescent stage and beyond. For example, the conversion scooter can operate as a sit down scooter having a seat and with the handlebars in a lowered position for seated riding. As the child grows or becomes more adept at balancing, the seat can be removed, the handlebars raised, the bucket swiveled around to the back of the handlebar shaft and the seat reinstalled on the front of the scooter, thereby providing a stand up scooter. Conversely, if the child does not want to ride in the standing position or is not able to ride in the standing position (e.g., the child is injured) or if the child outgrows the scooter and the scooter is passed down to a younger child, the handlebars may be lowered, the bucket swiveled around to the front and the seat removed from the front and re-installed over the foot platform, thereby providing a sit down scooter. Moreover, in each of these configurations all of the components of the scooter stay on the scooter, so there are no loose parts that need to be stored and/or located when the scooter is converted to the other configuration. Additionally, no tools are required to convert the conversion scooter from the stand up configuration to the sit down configuration and for the reverse conversion.

Referring now to the figures, and initially to FIGS. 1-6, in one embodiment the conversion scooter 10 includes a frame 20, a rear wheel 30 supporting a rearward or second end portion 22 of the frame 20, and first and second front wheels 34, 36 supporting a frontward or first end portion 24 of the frame 20. The first front wheel 34 is rotatably supported at a first end of a front axle 38 and the second front wheel 36 is rotatably supported at a second end of the front axle 38. In the illustrated embodiment, the front axle 38 is coupled to a steering or handlebar assembly 50 such that rotation or turning of the steering assembly 50 rotates or turns the front axel 38 and front wheels 34, 36. In one embodiment, the steering assembly 50 includes a front shaft 52, hand grips 54, 56 and a lock knob 58. The steering assembly 50 is coupled to the frame 20 adjacent the first end 24 of the frame 20. The front shaft 52 may be a telescoping shaft that includes an upper shaft 51 that is slidably received in a lower shaft 53

Figure 9:
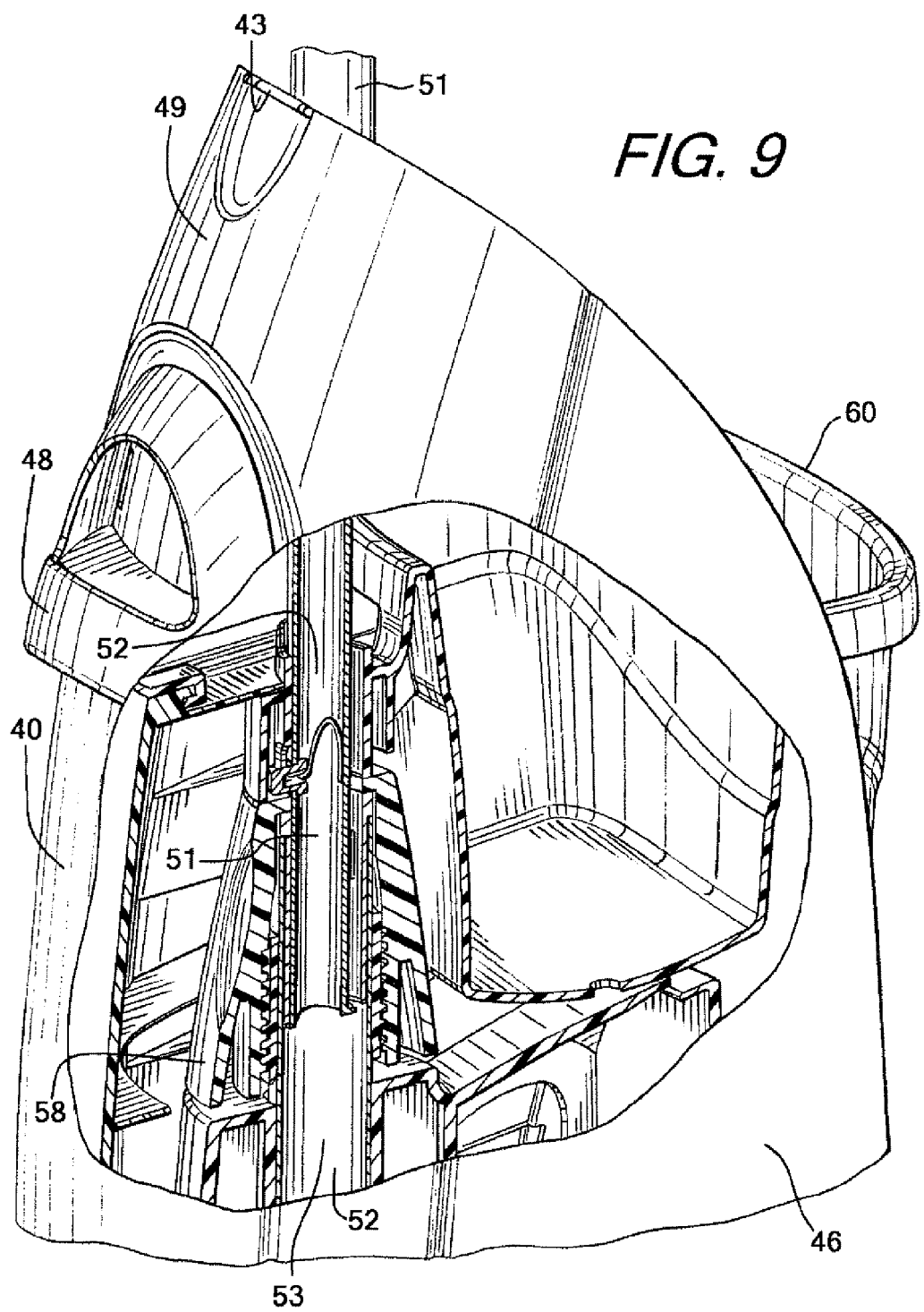
FIG. 9 is a partially cut-away front perspective view of a portion of the conversion scooter of FIG. 3 in the stand to ride configuration.

(see FIG. 9). Also in the illustrated embodiment, a basket 60 is attached to the front shaft 52 by a basket clamp 62. Alternatively, the conversion scooter may have no basket 60 attached, or a different storage member may be attached, such as, for example, a bag or a bucket.

As illustrated in FIGS. 1 and 5-8, the conversion scooter 10 includes a sit to ride configuration. In one embodiment of the conversion scooter 10 it is adapted for use as a sit to ride scooter in the first configuration as shown in FIG. 1. In the first configuration, a seat 40 is removably coupled to the first or forward portion 24 of the frame 20 at a front seat coupling and to the second or rearward portion 22 of the frame 20 at a rear seat coupling. In the illustrated embodiment, the seat 40 includes a curvilinear seat base 46, in cross section, and a seat back 48 that are integrally formed. Alternatively the seat 40 may be formed of a separate seat base 46 and seat back 48 that are attached together, for example, or there may be no seat back 48. The seat 40 has a top surface for riding and opposing side surfaces extending away from the top surface. In one embodiment the top surface of the seat 40 is generally parallel to the longitudinal axis of the frame 20 in the first configuration.

In a preferred embodiment of the first configurations or sit to ride configuration, the front seat coupling comprises a front coupling tab 41 that extends outward from a first end 47 or front seat area 47 of the seat 40, and a seat coupling receptacle 21 that extends inward from a front seat mating area 27 of the frame 20 (see FIGS. 7 and 8) to receive the front coupling tab 41. The front seat 40 is coupled to the frame 20 by inserting the front coupling tab 41 into the seat coupling receptacle 21 and pushing and/or pivoting the first end 47/front seat area 47 toward and against the front seat mating area 27. The front seat coupling is disengaged by pivoting the seat 40 upwards at the rear and pulling the seat 40 so that the front coupling tab 41 slides out of the seat coupling receptacle 21. As further illustrated in FIG. 2, the first end 47 of the seat 40 may also include support tabs 45 that engage with seat support slots 28 in the front seat mating area 27 of the frame 20, further securing the seat 40 in the sit to ride position. Alternatively, the tabs 41, 45 may be on the frame 20 and the receptacle 21 and slots 28 may be on the seat 40, or any combination of tabs and/or slots may be on both the seat 40 and the frame 20, for example.

Figure 5:
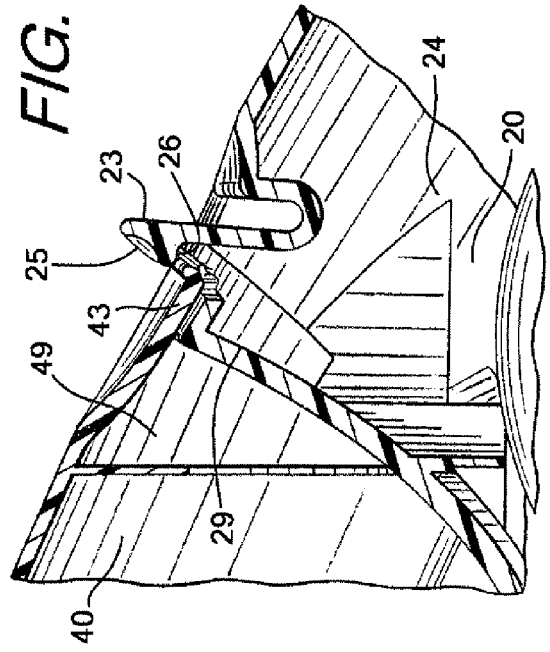
FIG. 5 is a cut-away side view of a portion of the conversion scooter of FIG. 1 with the seat in a latched sit to ride position.
Figure 6:
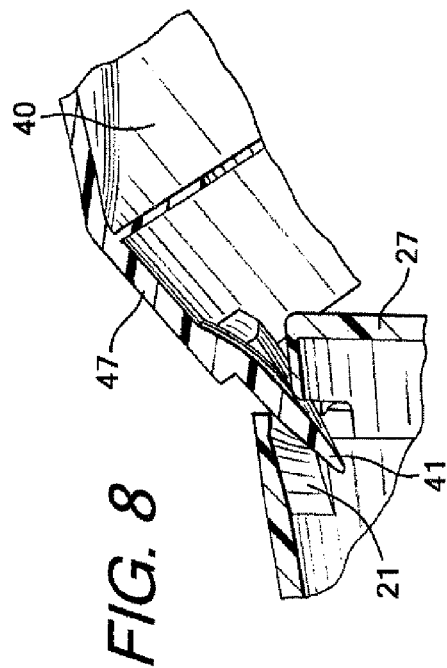
FIG. 6 is a cut-away side view of the portion of the conversion scooter of FIG. 5 with the seat in an unlatched sit to ride position.
Figure 7:
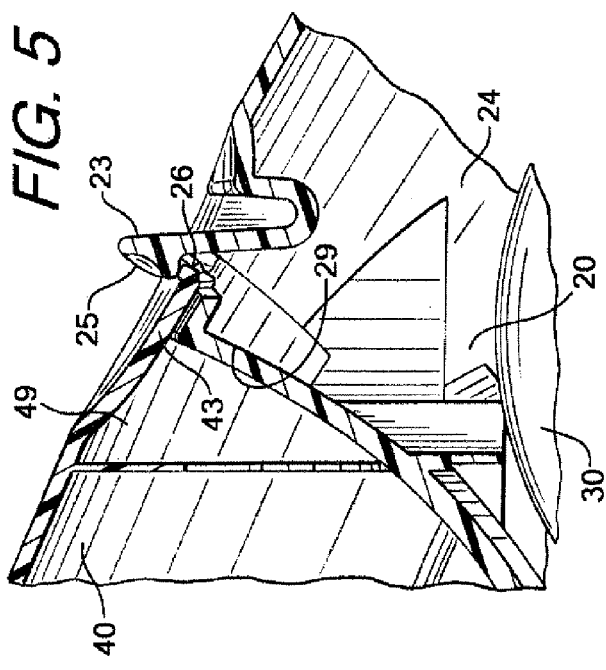
FIG. 7 is a cut-away side view of another portion of the conversion scooter of FIG. 1 with the seat in a latched sit to ride position.
Figure 8:
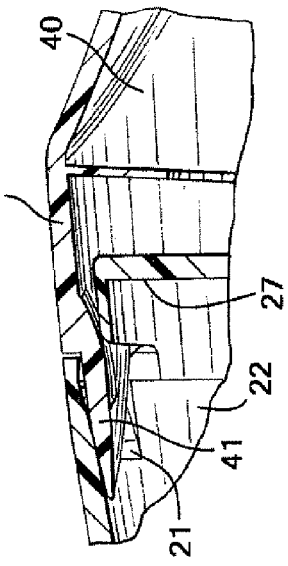
FIG. 8 is a cut-away side view of the portion of the conversion scooter of FIG. 7 with the seat in a partially removed position.

As shown in FIGS. 5 and 6, in one embodiment of the first configuration or sit to ride configuration, the rear seat coupling includes a rear coupling tab 43 at the second end 49 or rear seat area 49 of the seat 40, and a seat locking member 23 positioned on a rear seat mating area 29 of the frame 20. The seat locking member 23 may be any suitable retaining member such as a flexible clip, a latch, a threaded fastener or a friction fit coupling, for example. In the illustrated embodiment the seat locking member 23 is a flexible clip. The rear seat coupling is engaged by pushing the rear seat area 49 downwards so that the rear coupling tab 43 contacts a grip face 25 of the seat locking member 23. As the second end 49 of the seat 40 is pushed further downwards, the rear coupling tab 43 slides along the grip face 25, thereby forcing the seat locking member 23 to flex in a direction away from the seat 40 until the rear coupling tab 43 slides below the bottom end of the grip face 25. A biasing force of the seat locking member 23 in the opposing direction causes the seat locking member 23 to move forward after the rear coupling tab 43 slides below the bottom end of the grip face 25, thereby causing a lock face 26 of the seat locking member 23 to engage the top surface of a portion of the rear coupling tab 43 and secure the second end 49 in the seated position. The rear seat coupling may also be engaged by pulling the seat locking member 23 away from the seat 40, dropping the second end 49 of the seat 40 into position and releasing the seat locking member 23, which springs forward or toward the seat 40 to lock the seat 40 in position. The rear seat coupling is disengaged by pushing or pulling rearwards on the seat locking member 23 and pulling upwards on the second end 49 of the seat 40. Alternately, a seal locking member may be provided on the seat 40 and it may engage a portion of the frame 20 to lock the rear seat area to the frame 20.

As further illustrated in FIGS. 3-4 and 9-12, the conversion scooter 10 is adapted to be configured in a second configuration known as a stand to ride configuration. In one embodiment of the second configuration or stand to ride configuration of the conversion scooter 10, the seat 40 is configured as a housing, fairing, shield or bumper, which is coupled to the first end or forward portion 24 of the frame 20 at a front housing coupling and to the steering assembly 50 at a front shaft coupling. In the second configuration the seat 40 is generally transverse to a longitudinal axis of the frame 20. Further, a top surface of the frame 20 is configured as a foot platform 80, providing a surface for the rider to stand on when used in the stand to ride mode. The foot platform 50 extends between the first end portion 24 and the second end portion 22 of the frame 20.

In one embodiment of the second configuration or stand to ride configuration, the front housing coupling includes the front coupling tab 41 that extends outward from the front seat area 47 of the seat 40, and a front housing receptacle 71 that extends inward from a front housing mating area 77 of the frame 20 (see FIGS. 10 and 11). The seat 40 is engaged in the front housing coupling by inserting the front coupling tab 41 into the front housing receptacle 71 and pushing the front seat area 47 toward and against the front housing mating area 77. The seat 40 is disengaged from the front housing coupling by pulling the seat 40 upwards or away from the front housing mating area 77 so that the front coupling tab 41 slides free of the front housing receptacle 71. As further illustrated in FIG. 3, the support tabs 45 may engage with front housing support slots 78 in the front housing mating area 77 of the frame 20, further securing the seat 40 as a front housing in the stand to ride position. In the second configuration the steering assembly 50 is located between the seat 40 and the second end 22 of the frame 20.

Also in one embodiment of the stand to ride configuration, the front shaft coupling comprises a shaft coupling clip 73 extending from an interior surface of the seat 40 to engage the front shaft 52 of the steering assembly 50. The shaft coupling clip 73 may include flexible prongs 75 that are biased inwardly towards each other. Alternatively, the shaft coupling may include any suitable securing means, such as a latch, threaded fasteners or a friction fit coupling, for example. The front shaft coupling is engaged by aligning the shaft coupling clip 73 with the front shaft 52 and pushing or pulling the seat 40 rearwards against the front shaft 52. The front shaft 52 forces the flexible prongs 75 open as the front shaft 52 is forced into the shaft coupling clip 73. When the front shaft 52 is fully inserted into the shaft coupling clip 73, the flexible prongs 75 spring back towards each other due to the biasing force, thereby locking the seat 40 onto the front shaft 52. In the illustrated embodiment, the upper shaft 51 is the portion of the front shaft 52 that engages with the shaft coupling clip 73.

To summarize, in the illustrated configurations of FIGS. 1-4, converting the conversion scooter 10 from a sit to ride configuration to a stand to ride configuration is accomplished by performing several steps. In one step of one embodiment, the seat 40 is removed by pushing or pulling the seat locking member 23 rearward, pulling the rear seat area 49 in an upward direction to clear the seat locking member 23, and pulling the seat 40 in a rearward and upward angled direction until the front coupling tab 41 and the support tabs 45 slide free of the seat coupling receptacle 21 and the seat support slots 28 respectively, thereby uncovering the foot platform 80 on the top surface of the frame 20.

In another step, the basket 60 is swiveled around the front shaft 52 so that the basket 60 is moved from a position in front of the front shaft 52 to a position behind the front shaft 52. The steering assembly 50 may be raised in another step by twisting the lock knob 58 in a loosening direction, pulling up on the steering assembly 50 to slidably extend the upper shaft 51 upwards from the lower shaft 53, and twisting the lock knob 58 in the tightening direction until the steering assembly 50 is secured in the extended stand to ride position.

In another step, the seat 40 is attached in a front housing configuration by inserting the front housing coupling tab 41 and the support tabs 45 of the seat 40 into the front housing receptacle 71 and the front housing support slots 78 respectively, pushing the seat 40 downward until the front seat mating area 27 of the seat 40 engages the front housing mating area 77 of the frame 20, and pushing or pulling the seat 40 rearwards until the front shaft 52 is securely engaged by the shaft coupling clip 73.

Conversely, converting the conversion scooter 10 from a stand to ride configuration to a sit to ride configuration is accomplished by performing several steps essentially in the reverse order described above. In one step the seat 40 in the front housing configuration is removed by pushing or pulling the seat 40 forward to pull the shaft coupling clip 73 free from the front shaft 52, and pulling the seat 40 upwards until the coupling tab 41 and the support tabs 45 slide out of the front housing receptacle 71 and the front housing support slots 78 respectively. In another step, the basket 60 is swiveled around the front shaft 52 so that the basket 60 is moved from a position behind the front shaft 52 to a position in front of the front shaft 52.

The steering assembly 50 may be lowered in another step by twisting the lock knob 58 in a loosening direction, pushing down on the steering assembly 50 to slidably retract the upper shaft 51 downwards into the lower shaft 53, and twisting the lock knob 58 in the tightening direction until the steering assembly 50 is secured in the lowered sit to ride position. In another step, in one embodiment the seat 40 is attached over the foot platform 80 in a seat configuration by inserting the coupling tab 41 and the support tabs 45 of the seat 40 into the seat coupling receptacle 21 and the seat support slots 28 respectively and pushing the rear seat area 49 downward until the front coupling tab 41 is securely engaged by the seat locking member 23.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims. For example, the steps of converting from a sit to ride scooter to a stand to ride scooter, or from a stand to ride scooter to a sit to ride scooter, may be performed in any desirable order. In addition, certain steps may be altered or omitted. For example, the basket 60 may be positioned in any desirable position around the front shaft 52 in either the sit to ride or the stand to ride scooter configurations, or the basket 60 may be left in the same position when converting from one configuration to the other. Similarly, the steering assembly 50 may be extended to any desirable position in either the sit to ride or the stand to ride scooter configurations, or the steering assembly 50 may be left in the same position when converting from one configuration to the other. The steering assembly 50 is steerable by a user in the first and second configurations.

What is claimed is:

1. A conversion scooter, comprising:
    a frame having a first end portion and a second end portion, and a foot platform extending between the first end portion and the second end portion;
    a steering assembly rotatably coupled to the frame adjacent the first end portion, at least one wheel coupled to the steering assembly, the steering assembly having a handlebar at a distal end thereof;
    a wheel rotatably coupled to the frame adjacent a second end portion of the frame;
    a seat removably coupled to the frame, the seat having a first end and a second end, in a first configuration of the conversion scooter the first end of the seat is coupled to the frame near the first end portion of the frame and the second end of the seat is coupled adjacent the second end portion of the frame, the conversion scooter adapted for use as a sit to ride scooter in the first configuration, and in a second configuration of the conversion scooter the first end of the seat is coupled to a different portion of the frame at the first end portion of the frame and the seat is generally transverse to a longitudinal axis of the frame, the conversion scooter adapted for use as a stand to ride scooter in the second configuration, wherein the seat does not rotate with the steering column in the second configuration, and wherein the steering assembly is located between the seat and the second end portion of the frame when the seat is in the second configuration.

2. The conversion scooter of claim 1, wherein the seat has a top surface and opposing side surfaces extending away from the top surface.

3. The conversion scooter of a claim 2, wherein the seat has a curvilinear cross section.

4. The conversion scooter of claim 1, further comprising a front axle coupled to the steering assembly, a first wheel coupled adjacent one end of the front axle and a second wheel coupled adjacent an opposing end of the front axle.

5. The conversion scooter of claim 1, further comprising a first seat locking member securing the second end of the seat to the frame in the first configuration.

6. The conversion scooter of claim 1, further comprising a second seat locking member securing the seat to the steering assembly in the second configuration.

7. The conversion scooter of claim 1, further comprising a basket coupled to the steering assembly in the first configuration and the second configuration.

8. The conversion scooter of claim 1, wherein the steering assembly is steerable by a user in the first and second configuration.

9. The conversion scooter of claim 1, wherein the seat can be transitioned from the first configuration to the second configuration, and from the second configuration to the first configuration, without the use of tools.

10. A conversion scooter, comprising:
a frame having a first end portion and a second end portion, and a foot platform extending between the first end portion and the second end portion to support a foot of a rider in a scooter mode;
a steering assembly coupled to the frame adjacent the first end portion, the steering assembly having a first wheel and a second wheel coupled thereto;
a single wheel rotatably coupled to the frame adjacent a second end portion of the frame;
a seat removably coupled to the frame, wherein the conversion scooter can be configured in a first configuration and a second configuration, the seat being coupled to the frame and having a seat surface generally parallel to a longitudinal axis of the frame in the first configuration, and the seat being removable from the frame and adapted to be coupled to a different portion of the frame and in another location in the second configuration, the seat surface being generally perpendicular to the longitudinal axis of the frame in the second configuration, and wherein the seat does not rotate with the steering assembly in the second configuration.

11. The conversion scooter of claim 10, wherein the steering assembly comprises a telescoping shaft to raise and lower the steering assembly.

12. The conversion scooter of claim 11, further comprising a handlebar connected to the telescoping shaft for steering the steering assembly.

13. The conversion scooter of claim 10, further comprising a basket coupled to the steering assembly in the first and second configurations.

14. The conversion scooter of claim 10, wherein in the first configuration the seat is coupled to the frame adjacent one of the first end portion and second end portion of the frame via a plurality of tabs and receivers, and wherein the seat is coupled to the frame adjacent the other of the first end portion and second end portion of the frame via a releasable latch.

15. The conversion scooter of claim 10, wherein in the second configuration the seat is coupled to the frame adjacent the first end portion of the frame via a plurality of tabs and receivers, and wherein in the second configuration the seat is coupled to the steering assembly with a releasable clip.

16. A conversion scooter, comprising:
a frame having a first end portion and a second end portion, and a generally horizontal and planar surface forming a foot platform extending between the first end portion and the second end portion;
a steering assembly coupled to the frame adjacent the first end portion, the steering assembly having a first wheel rotatably coupled thereto;
a second wheel rotatably coupled to the frame adjacent a second end portion of the frame;
a seat removably coupled to the frame in a first configuration and a second configuration, wherein no tools are needed to transition the scooter from the first configuration to the second configuration, the seat being coupled to the frame and having a seat surface generally parallel to a longitudinal axis of the frame in the first configuration, the conversion scooter adapted for use as a sit to ride scooter in the first configuration, a first releasable seat locking member adjacent a second end of the seat and securing the seat to the frame in the first configuration, the first releasable seat locking member being connected to one of the seat and the frame when the first releasable seat locking member is unlocked, the seat being removed from the frame and movable to the second configuration, a second releasable seat locking member securing the seat to a different portion of the frame in the second configuration, the conversion scooter adapted for use as a stand to ride scooter in the second configuration, wherein the steering assembly is rotatable in the first configuration and the second configuration, and wherein the seat does not rotate with the steering assembly in the second configuration.

17. The conversion scooter of claim 16, wherein the steering assembly is steerable by a user in the first configuration and the second configuration.

18. The conversion scooter of claim 16, wherein the steering assembly is located between the seat and the second end portion of the frame when the seat is in the second configuration.

19. The conversion scooter of claim 16, wherein the steering assembly comprises a telescoping shaft to raise and lower the steering assembly.

20. The conversion scooter of claim 16, further comprising a second wheel rotatably coupled to the steering assembly.

* * * * *